(12) United States Patent
Höhnel

(10) Patent No.: US 6,956,424 B2
(45) Date of Patent: Oct. 18, 2005

(54) TIMING OF AND MINIMIZING EXTERNAL INFLUENCES ON DIGITAL SIGNALS

(75) Inventor: Falk Höhnel, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/489,077

(22) PCT Filed: Aug. 30, 2002

(86) PCT No.: PCT/EP02/09693

§ 371 (c)(1),
(2), (4) Date: Mar. 5, 2004

(87) PCT Pub. No.: WO03/023579

PCT Pub. Date: Mar. 20, 2003

(65) Prior Publication Data

US 2004/0232958 A1 Nov. 25, 2004

(30) Foreign Application Priority Data

Sep. 6, 2001 (EP) ............................................. 01121403

(51) Int. Cl.$^7$ ........................ H03K 3/00; G11C 11/063
(52) U.S. Cl. ........................ 327/297; 327/141; 365/195
(58) Field of Search .................................. 327/141, 156, 327/161, 291, 295, 297; 365/195, 233

(56) References Cited

U.S. PATENT DOCUMENTS 6,003,118 A 12/1999 Chen
2002/0114195 A1 * 8/2002 Ahn et al. ................... 365/194

* cited by examiner

*Primary Examiner*—Terry D. Cunningham

(57) ABSTRACT

The performance of digital signals depends to a great extent on the frequency. However, the higher the frequency, the shorter the remaining time, in which digital signals can be reliably received by a receiver from a driver via a printed conductor. The run time of the clock pulse and signals must be optimized in such a way that no timing losses occur at any location, even in the extreme environmental conditions. The invention improves the timing and minimizes external influences by coupling the output signals to an internal PLL clock pulse.

4 Claims, 4 Drawing Sheets

TIMING OF AND MINIMIZING EXTERNAL INFLUENCES ON DIGITAL SIGNALS

CROSS REFERENCE TO RELATED APPLICATIONS

This application is the U.S. National Stage of International Application No. PCT/EP02/09693, filed Aug. 30, 2002 and claims the benefit thereof. The International Application claims the benefits of European application No. 01121403.8 EP filed Sep. 6 2001, both of the applications are incorporated by reference herein in their entirety.

FIELD OF INVENTION

The invention relates generally to improving the timing and minimizing external influences on digital signals and by coupling the output signals to an internal PLL clock pulse.

BACKGROUND OF THE INVENTION

The performance of digital systems is heavily dependent on the frequency. On the other hand, the higher the frequency, the shorter is the time remaining to convey digital signals reliably from a driver via a conductor track to the receivers. Limiting factors are the clock-to-output time, the run time on the board, the setup/hold time of the receiver, output and input skew (skew of the transmitters and receivers) and clock skew or jitter (tskew).

FIG. 1 shows the timing of a digital signal at the output of the driver of a transmitter and at the input of the receiver, the diagram illustrating the time effect of the factors mentioned.

The setup time requirement determines for how many ns before the clock edge a signal to be clocked in has to be stable. The hold time requirement determines for how long after a clock edge the signal has to remain stable. Thus, if the position of the times of clock and signal with respect to each other is varied, this has a positive effect in respect of one requirement, but a negative effect in respect of the other requirement.

In extremely favorable environmental conditions (low temperature, high supply voltage, powerful drivers, receiver with small parasitic capacity) the signals are very fast. In this case a hold time problem arises.

In extremely unfavorable environmental conditions (high temperature, low supply voltage, weak drivers, receiver with large parasitic capacity) the signals are very slow. However, the clock may not also be slow. In this case a setup time problem arises.

The run time of clock and signals must be optimized in such a way that even in extreme environmental conditions no timing violations arise anywhere. The tradeoff determines the maximum possible frequency and therefore the performance of the system or imposes constraints in the architecture.

Typically, a table is produced which lists all the timing parameters to be taken into account for each signal and calculates a budget or a violation. This is performed for the fast and the slow case. The parameters can be influenced (within limits) via the choice of components, the board layout and (if transmitter or receiver are contained in an ASIC) via the ASIC design. The limits result from the components chosen (driver strength, setup/hold time according to the data sheet), the distances between the components on the board, the architecture of the networks (unidirectional/bidirectional signals, number of drivers/receivers involved) and frequency or clock period. Then an optimization is performed. However, if the optimization is performed for the slow case, this is detrimental to the fast case, and vice versa.

TABLE 1

Setup and hold time margin calculation

| signal name | tskew chip | tco, min | tco, max | trun, min | trun, max | tsetup | thold | hold margin | setup margin |
|---|---|---|---|---|---|---|---|---|---| hold margin = tco, min + trun, min − tskew − thold
setup margin = 7.5 ns − tco, max − trun, max − tsetup − tskew In some cases the problem was also not even solved at all, but worked around. An example is SDRAM address signals in the PC: In this case the address signals are sent off from the driver and clocked in at the receiver only with the next-but-one clock. This has implications for the design of the SDRAM controller and the performance of the overall system. Moreover, PC motherboards running at an SDRAM bus frequency of 133 MHz are now only equipped with a maximum of 3 SDRAM modules (DIMMs) in order to steer clear of timing problems. However, this limits the maximum possible memory configuration.

An already partly common variant for minimizing the clock skew between transmitter and receiver uses a PLL in the transmitter device (e.g. ASIC); see FIG. 2. In this arrangement, clock and signals for the SDRAMs come from the same chip. An additional clock output is looped back again to the PLL of the transmitter and in fact has the same physical length as the receiver clock. The PLL transmits this feedback clock earlier in line with the board run time t_run so that in this way the feedback clock will then arrive in phase with the reference clock clk_ref at the PLL input of the ASIC. Because the receiver clock has the same run time, the receiver clock is also automatically in phase at its receiver at time T0. The clock skew between transmitter and receiver is therefore always equal to zero.

SUMMARY OF THE INVENTION

The invention leads to an approximately constant clock-to-output time for the slow and the fast case. By means of board layout measures it is also ensured that the edge distance of clock and signals on the board is maintained and is unchanged at the receiver. In this way it is possible to increase the maximum frequency or to operate the bus frequency with fewer restrictions. The design risk for the timing is considerably reduced (in FIG. 3 arrows indicate that all signal and clock ranges are implemented identically, i.e. including the line lengths and the buffers which determine the clock-to-output time. The clock-to-output times are therefore independent of environmental influences and also of the ASIC fabrication process. The run times of the signals on the board are also set to equality and are therefore independent of environmental influences.

An important feature of the invention is that the output FFs for this bus are not to be clocked using the normal system clock for the ASIC core, but with a clock which is derived from the output clock of the PLL (see FIG. 3). This clock is in fact sent off correspondingly somewhat earlier by the PLL in the slow case, in order to be in phase with the reference clock at the PLL input. In the slow case the outputs of the signals are also weaker and need longer on the board. For this reason it is useful to send the signals off earlier too. This takes place automatically through retiming by means of the output clock. In the fast case, clock and signals are sent off correspondingly later. Buffer type and placing of clock and signal output buffers are implemented in identical fashion. The clock-to-output distance tco is always the same in both extreme cases. The clock-to-output time can be reduced even further by means of delay elements in the output clock path.

In the board layout the run times of the signals are also set to equality with those of the clocks and feedback clocks. All the signals of the bus are trimmed to the same length. The clock-to-signal distance from the driver device to the receivers therefore remains the same, irrespective of the environmental conditions. In this way the number of parameters is immediately reduced in the timing table: clock-to-output, output skew and run time skew. Measures are also taken to ensure equality of the parameters for the fast or slow case.

DETAILED DESCRIPTION OF INVENTION

Figure 1:
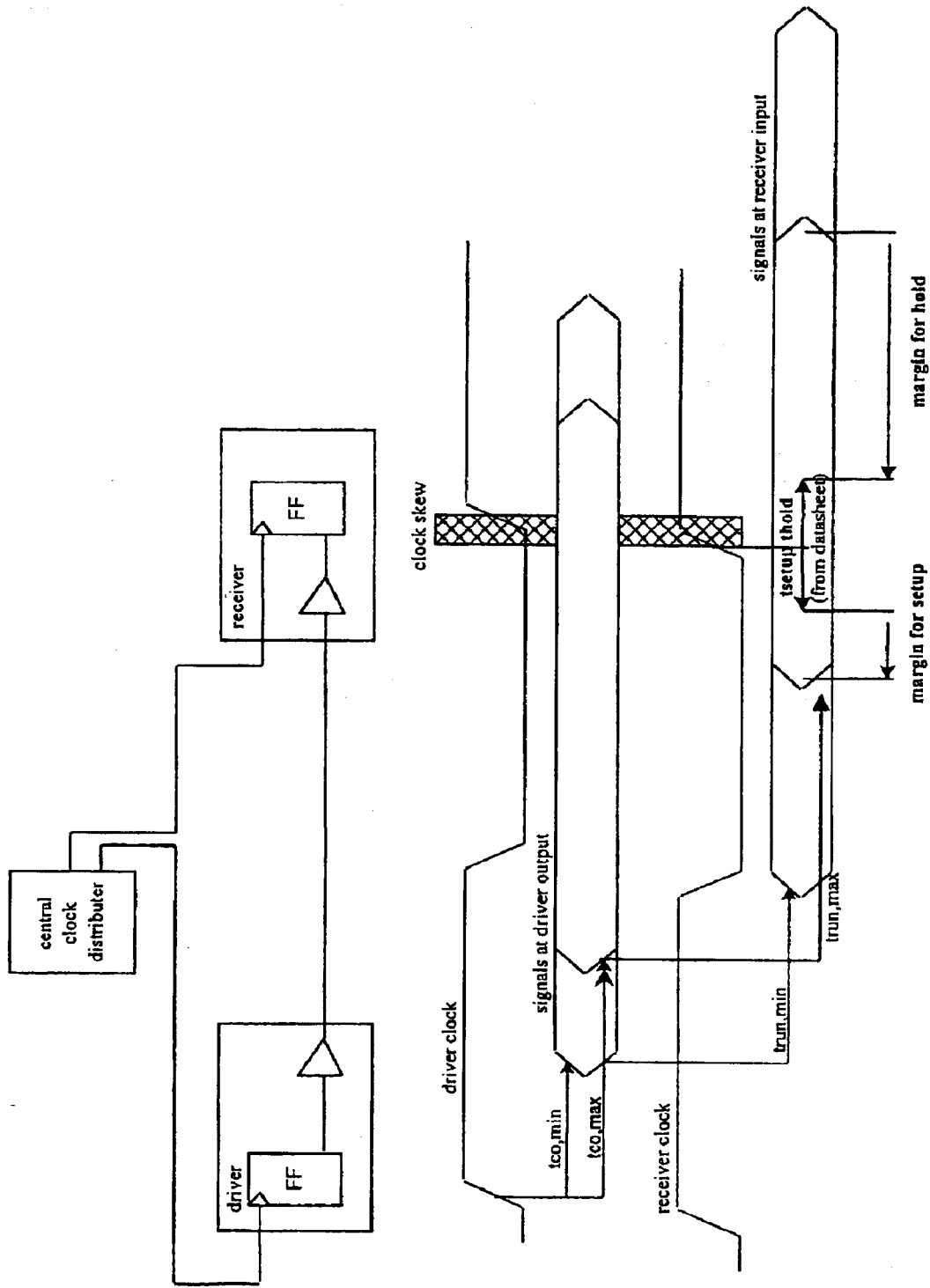
FIG. 1. shows the timing of a digital signal at the output at the output of the driver of a transmitter and at the input of the receiver, FIG. 2. shows an already partly common variant for minimizing the clock skew between transmitter and receiver uses a PLL in the transmitter device, FIG. 3. shows a clock which is derived from the output clock of the PLL, and FIG. 4. shows an SDRAM memory controller comprising an ASIC, 4×512 MB SDRAM DIMMs and a clock multiplier for 133 MHz.
Figure 2:
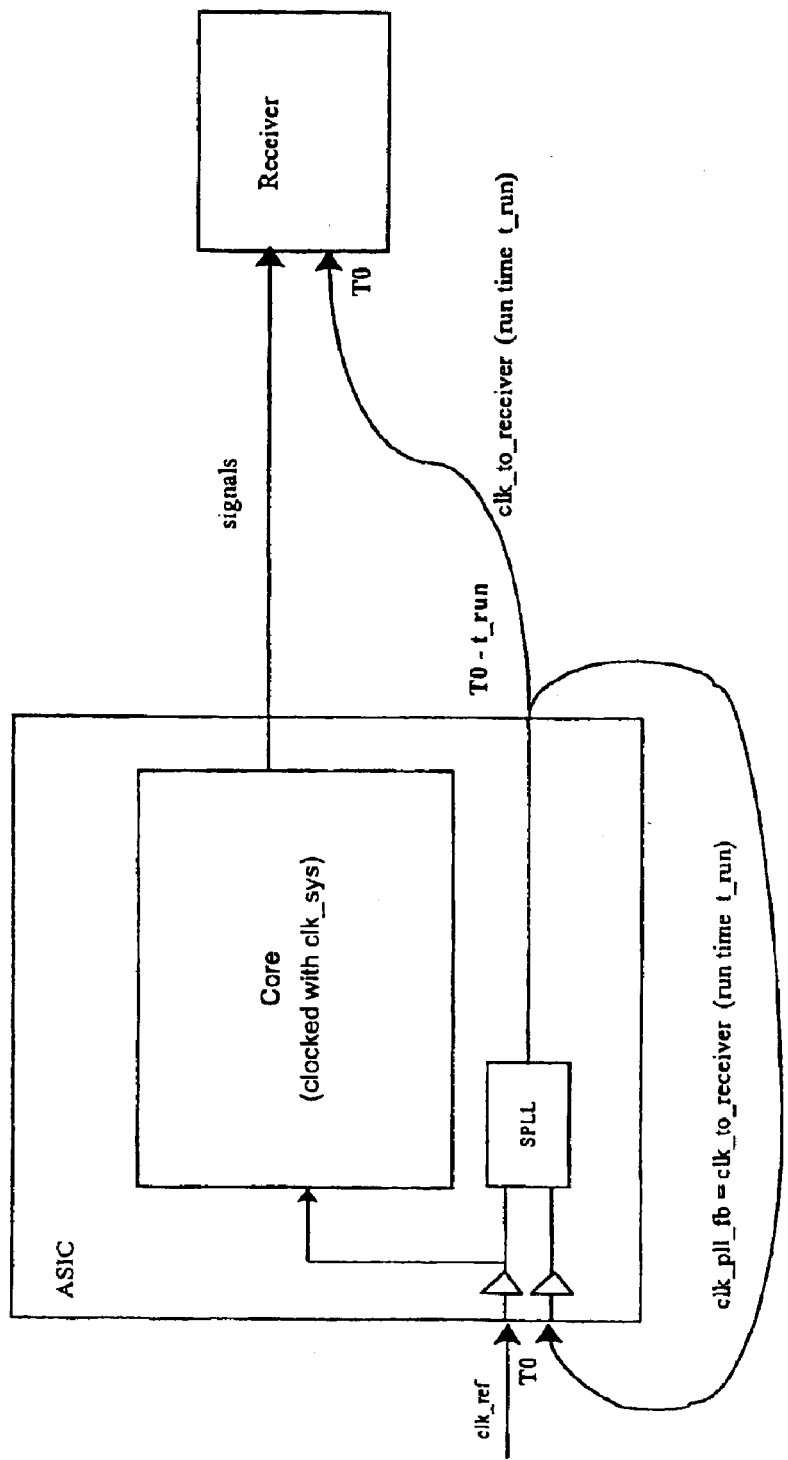
Figure 3:
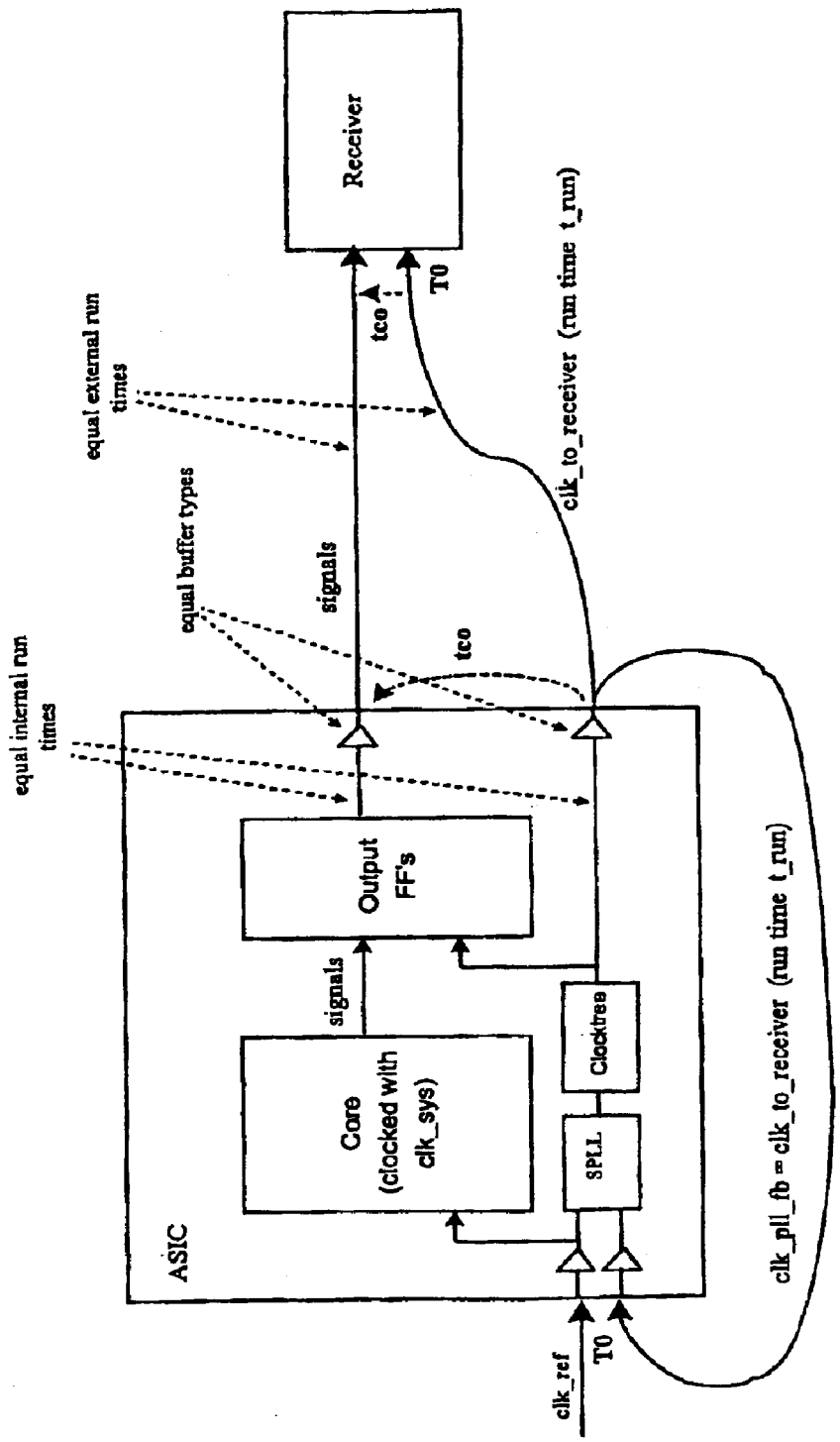
Figure 4:
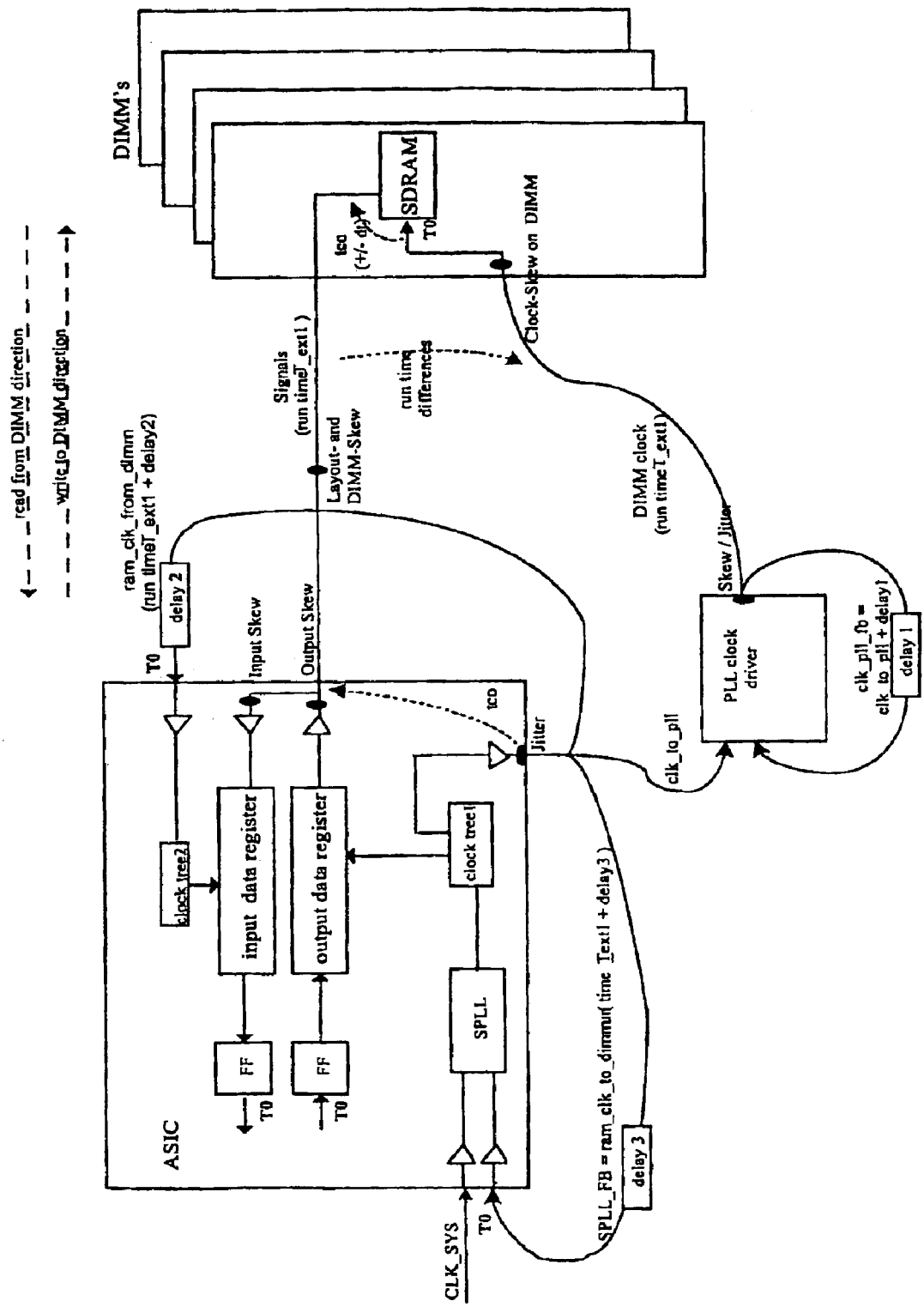

The principle presented is realized by way of example in an SDRAM memory controller comprising an ASIC, 4×512 MB SDRAM DIMMs and a clock multiplier for 133 MHz (see FIG. 4).

The PLL ensures that at time T0 the rising clock edges are in phase without skew both at the ASIC and also at the DIMMs. The signals are also sent off using the same clock, relative to the clock output with tco. If the run times of clock and signals are set to equality in the layout, then the distance between clock and signals is always exactly still Tco. This applies regardless of whether environmental factors and ASIC process factors have an accelerating or decelerating effect. Inaccuracies arise due to run time differences, output skew, board skew, DIMM skew and DIMM clock skew and must be taken into account in the conventional way.

In this exemplary embodiment, a PLL clock driver and three delay lines can also be seen. Furthermore, the input signals are handled separately. These delay lines are used to describe the independent adjustability of the timing of the forward and reverse direction of bidirectional digital signals.

By using the invention as described it is possible, in spite of the special requirements not yet applicable in the PC environment (4 DIMM slots with angled sockets due to low board form factor height of 3 cm; address signals apply only one clock), to realize a bus clock rate of 133 MHz with reliable timing and without performance penalties for the system.

Finally there follows an exemplary explanation with regard to the necessary distance between clock and signal for transmitter and receiver:

a) assumption: transmitter and receiver receive in-phase clocks from an external source. The transmitter has a specific clock-to-output time tco. The receiver requests a specific hold time thd (after the clock edge the signal must be kept stable for a certain time thd still so that the logic level is reliably detected).

b) simplest solution if tco>thd: Even if no run time at all were present on the board, the hold time would nevertheless be complied with.

c) If tco<thd: The board run time ensures a delay in the signal, thus ensuring that the hold time is still complied with.

d) The board run time is very long (great distance) and the clock period very short (high frequency): The board run time delays the signal edge so much that the setup time tsu of the receiver is not complied with. The signal is then possibly sampled with the past logic level!This case would be normal for 133 MHz and 10 cm distance and large capacitive load with a plurality of receivers. For this reason the signals are coupled to the clock with tco and both are sent off together. Because of the equal lengths on the board the distance tco to the receiver is maintained and there conforms to the hold time as in b). The SPLL ensures that clocking out is performed by precisely as much leading as required.

e) In the implementation it was even shown that tco<thd. This can be shifted to the correct setting by means of the board PLL and delay 1 (see FIG. 4).

ABBREVIATIONS USED

DIMM: Dual Inline Memory Module
DRAM: Dynamic Random Access Memory
SDRAM: Synchronous Dynamic Random Access Memory
DDR SDRAM: Double Data Rate Synchronous Random Access Memory
PLL: Phase Locked Loop
SPLL: PLL for SDRAM
Skew: Angled position, distortion
Clock skew: Time difference arising due to run times of different lengths and/or due to different driver strengths or receiver loads. Clock skew causes some receiver registers to switch earlier/later than others.
Output skew: The dispersion range of the tco times with related signals of the same type (buses)
Input skew: The dispersion range of the input run times from the external pin to the receiver in the chip with buses

I claim:

1. A digital system, comprising:
a processing device for processing data which is clocked via a first clock signal;
a data output register for transmitting data over a signal line to a further digital system; and
a PLL device which generates a second clock signal from the first clock signal, the second clock signal supplied as a clock signal to the further digital system via a clock line; and
a feedback loop of the PLL device having a same run time as the signal line,
wherein the second clock signal is supplied as a clock signal to the data output register, the clock line has the same run time as the said signal line.

2. The digital system according to claim 1, wherein the run times within the digital system and a buffer types of clock signals and data signals are kept identical.

3. The digital system according to claim 1, wherein equality of the run times is achieved by dimensioning the physical length of the respective lines and/or a delay device.

4. The digital system according to claim 2, wherein equality of the run times is achieved by dimensioning the physical length of the respective lines and/or a delay device.

* * * * *